United States Patent [19]
Ichino

[11] Patent Number: 6,141,506
[45] Date of Patent: Oct. 31, 2000

[54] CAMERA OR APPARATUS ADAPTED TO USE FILM CARTRIDGE OR DEVICE APPLICABLE TO SUCH CAMERA OR APPARATUS

[75] Inventor: Kazushige Ichino, Tokyo, Japan

[73] Assignee: Canon Kabushiki Kaisha, Tokyo, Japan

[21] Appl. No.: 08/844,847

[22] Filed: Apr. 22, 1997

Related U.S. Application Data

[63] Continuation of application No. 08/351,495, Dec. 7, 1994, abandoned.

[30] Foreign Application Priority Data

Dec. 8, 1993 [JP] Japan ................................ 5-340275

[51] Int. Cl.[7] ........................... G03B 17/26; G03B 17/02
[52] U.S. Cl. ........................ 396/538; 396/513; 396/516; 396/536
[58] Field of Search ................................ 396/512, 513, 396/514, 515, 516, 535, 536, 538, 284; 352/74, 72, 78

[56] References Cited

U.S. PATENT DOCUMENTS

| | | | |
|---|---|---|---|
| 3,463,580 | 8/1969 | Fredenschusz | 352/73 |
| 4,145,126 | 3/1979 | Bagby et al. | 352/72 |
| 4,982,211 | 1/1991 | Suzuki | 354/173.1 |
| 5,159,365 | 10/1992 | Takahashi et al. | 354/173.1 |
| 5,526,084 | 6/1996 | Kataoka et al. | 354/275 |

*Primary Examiner*—Alan A. Mathews
*Attorney, Agent, or Firm*—Robin, Blecker & Daley

[57] ABSTRACT

A camera or an apparatus adapted to use a film cartridge, or a unit applicable to the camera or the apparatus, includes a first member for opening a cover of a loading chamber provided for loading the camera or the apparatus with the film cartridge, a second member arranged to output a signal for causing the first member to act by an operation performed from outside, and a third member arranged to cause the first member to act by an operation performed from outside.

28 Claims, 13 Drawing Sheets

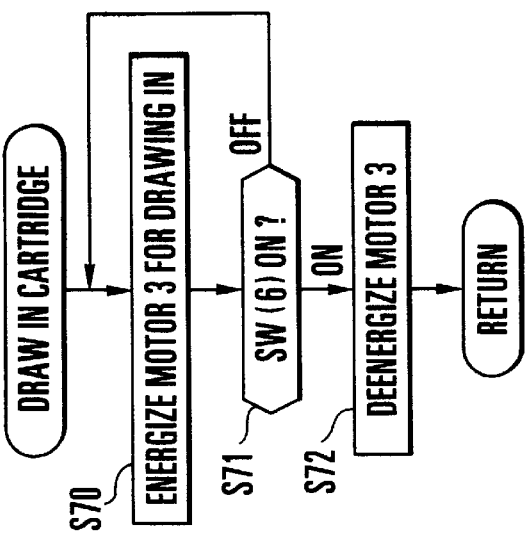
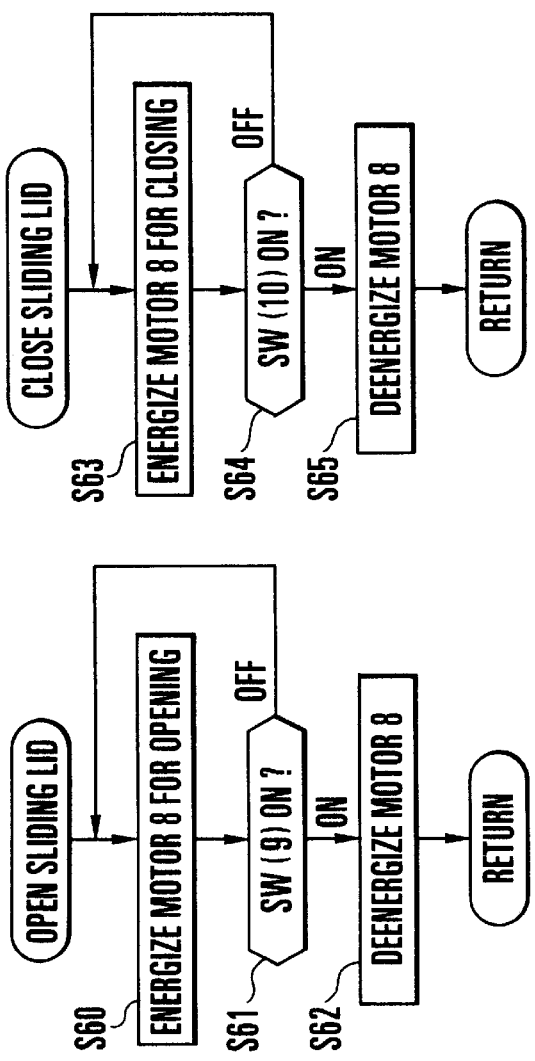

CAMERA OR APPARATUS ADAPTED TO USE FILM CARTRIDGE OR DEVICE APPLICABLE TO SUCH CAMERA OR APPARATUS

This is a continuation application under 37 CFR 1.62 of prior application Ser. No. 08/351,495, filed Dec. 7, 1994, now abandoned.

BACKGROUND OF THE INVENTION

1. Field of the Invention

This invention relates to an apparatus such as a camera or the like adapted for use of a film cartridge and more particularly to an improvement in operability of the apparatus in loading and unloading the film cartridge.

2. Description of the Related Art

FIG. 12 is a simplified oblique view showing the arrangement of the conventional camera. In loading the camera 101 with a film cartridge which is in a state of having a leader part of film put outside of the cartridge, it has been normally necessary to carry out the following procedure: (1) Correctly place the film cartridge in a cartridge chamber 101a in such a way as to have the film cartridge in mesh with a fork 103. (2) Adjust the length of the leader part of the film to have its fore end reach a spool 104. (3) Push a back lid 102 against the body of the camera 101 until the back lid 102 is locked by a back lid opening-closing lever 105. (4) Confirm, through a display device of the camera 101, that the spool 104 begins to take up the film and then a predetermined amount of the film has been wound on the spool 104. (5) If the amount of film wound on the spool is insufficient, confirm it on the display, then open the back lid 102 and repeat the procedure from the step (2).

In taking the film cartridge out from the camera 101, the following procedure is necessary. (6) After shots have been taken for a prescribed number of frames, the camera 101 automatically rewinds the film. Then, confirm completion of the rewinding. (7) Operate the back like opening-closing lever 105 to open the back lid 102. (8) Take out the film cartridge from the cartridge chamber 101a in a manner reverse to the film loading step. (9) Push the back lid 102 against the camera body 101 until the back lid 102 is locked by the back lid opening-closing lever 105.

In a case where the film cartridge is to be taken out before taking all shots for the prescribed number of frames, a forced rewinding switch 106 is pushed and completion of rewinding is confirmed before the steps (7), (8) and (9) mentioned above.

However, the film cartridge loading operation described above necessitates the adjustment work on the length of the leader part and confirmation of completion of winding. The reliability of the operation lowers in a dark place or in the event of a low visual acuity or unaccustomedness of the operator.

In the above-stated film cartridge taking out operation, the confirmation of completion of rewinding of film is sometimes made through the driving sound, driving vibrations, etc., of a film rewinding motor. In such a case, the confirmation tends to be incorrectly made due to ambient noises. Further, in the event of an untimely stoppage of film rewinding before completion of it due to the exhaustion of battery energy, etc., the completion of film rewinding might be incorrectly confirmed. If the back lid 102 is opened in such a state, a coil of exposed film would be ruined.

The forced rewinding switch 106 is disposed in a position which varies with the cameras and the internal mounting conditions of electrical parts. The position is also not easily discernible and thus tends to confuse the operator in general. Besides, since the use of the forced rewinding switch 106 is not frequently required, this switch is designed to be not readily operable and thus has necessitated the operator to use some special protruding tool or the like.

Meanwhile, a cartridge containing a film without having a leader part of the film protruding outside and a camera adapted for use of that cartridge including a leader part feeding-out mechanism and an automatic film transporting and rewinding mechanism have recently been proposed. Such a film cartridge in combination with such a camera solves some of the problems mentioned above. However, many of the problems still remain to be solved.

SUMMARY OF THE INVENTION

One aspect of this invention lies in providing a camera or an apparatus adapted to use a film cartridge or a device which is applicable to the camera or the apparatus is provided with first means for opening a cover (or lid) of a loading chamber which is arranged to be used to load the camera with the film cartridge, second means for outputting a signal for actuating the first means by an operation performed from outside, and third means for outputting a signal for actuating the first means by an operation performed from outside. These means enable the embodiment to enhance the film-cartridge loading-and-unloading operability thereof.

Another aspect of this invention lies in the provision of a camera or an apparatus adapted to use a film cartridge, or a device or unit applicable to the camera or the apparatus and is provided with first means for closing a cover of a loading chamber which is arranged to be used to load the camera with the film cartridge, second means for outputting a signal for actuating the first means by an operation performed from outside, and third means for outputting a signal for actuating the first means by an operation performed from outside. These means enhance the film-cartridge loading-and-unloading operability of the camera.

The above and other aspects and features of this invention will become apparent from the following detailed description of embodiments thereof taken in connection with the accompanying drawings.

BRIEF DESCRIPTION OF THE DRAWINGS

FIG. 5 is a flow chart showing the subroutine of a sliding lid opening action shown in the flow charts of FIGS. 4(a) and 4(c).

FIG. 6 is a flow chart showing the subroutine of a sliding lid closing action shown in the flow charts of FIGS. 4(a) and 4(c).

FIG. 7 is a flow chart showing the subroutine of a cartridge drawing in action shown in the flow charts of FIGS. 4(a) and 4(c).

DETAILED DESCRIPTION OF THE PREFERRED EMBODIMENTS

Some of preferred embodiments of this invention are described below with reference to the drawings.

Figure 1:
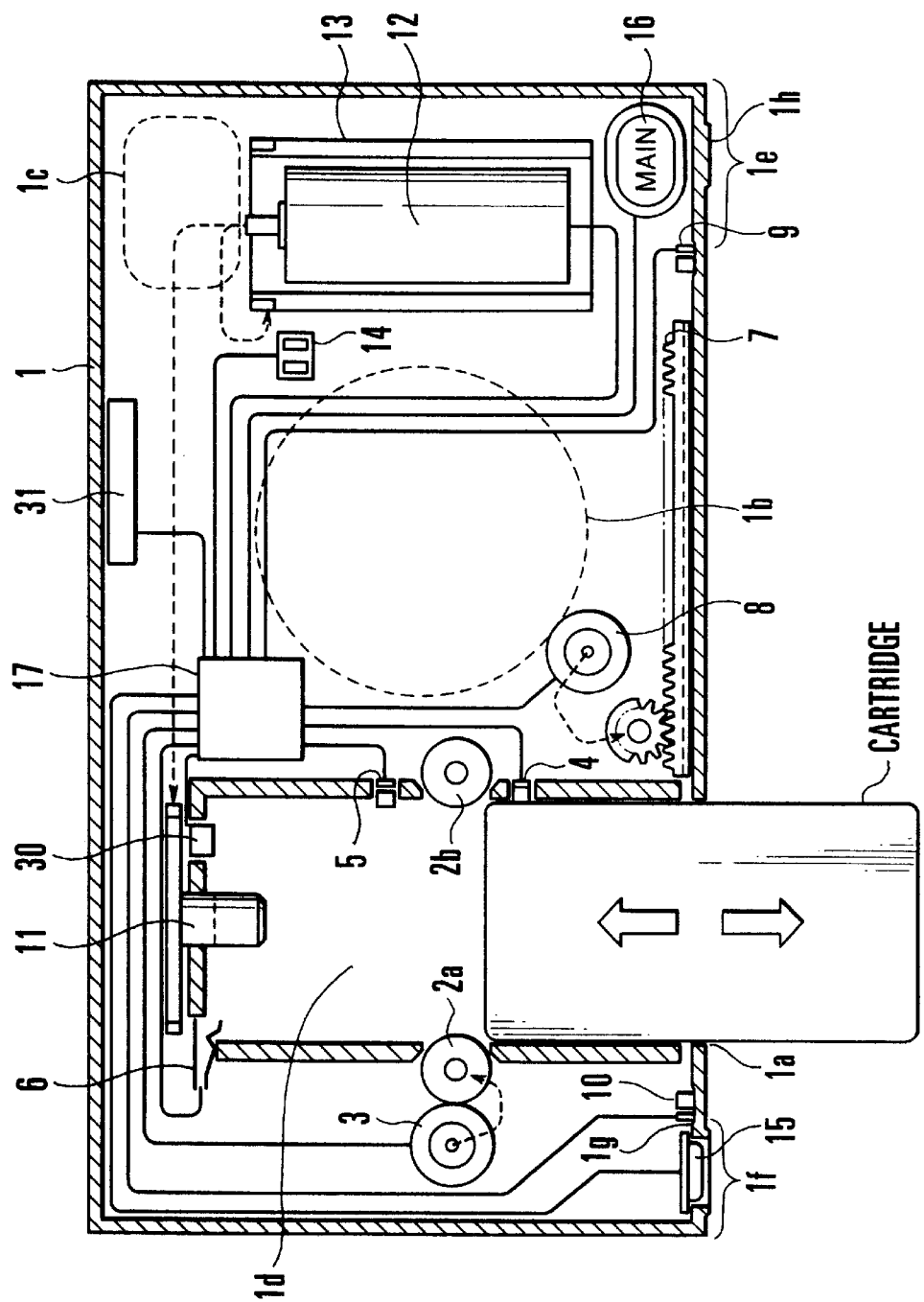
FIG. 1 is a vertical section showing in outline the arrangement of essential parts of a camera arranged according to this invention as an embodiment thereof.
Figure 2:
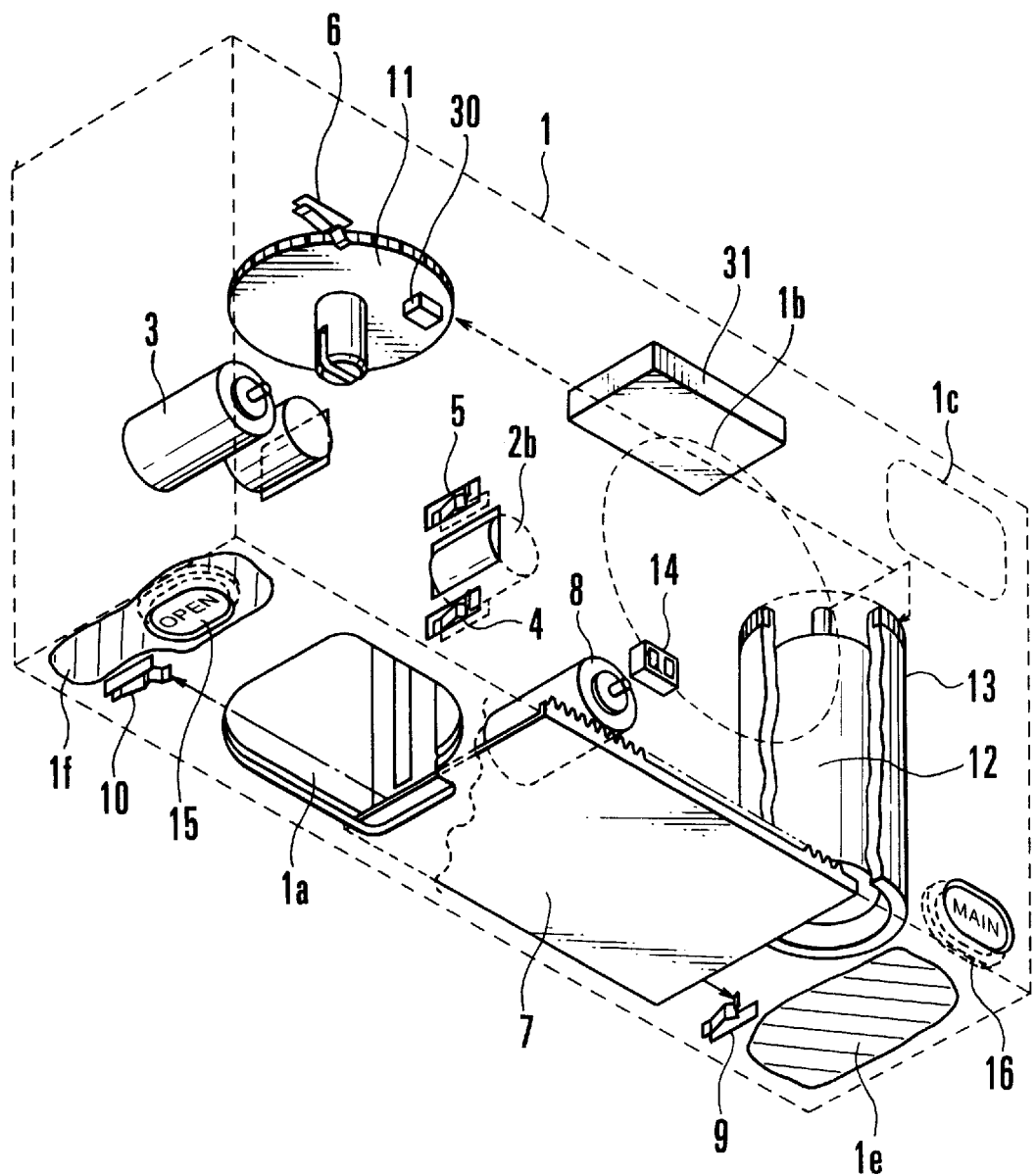
FIG. 2 is an oblique view showing in outline the arrangement of essential parts of the camera of FIG. 1.

FIG. 1 shows in a vertical section a camera which is arranged as a first embodiment of this invention. FIG. 2 is an oblique view schematically showing the camera of FIG. 1 as viewed from the bottom side of the camera. Referring to these figures, the embodiment is arranged to load the camera with a film cartridge by inserting the cartridge from an opening part 1a formed in the body of the camera 1 toward a film winding shaft. Parts indicated with broken lines represent elements such as photographing and viewfinder mechanisms.

Referring to FIGS. 1 and 2, rubber rollers 2a and 2b are arranged within a cartridge chamber 1d to be rotated by a roller driving motor 3 in such a way as to draw the cartridge inward and outward by guiding the side face of the cartridge. Further, switches 4, 5 and 6 are arranged also within the cartridge chamber 1d to detect how deep the cartridge is drawn into the cartridge chamber 1d. The switch 4 is called a start switch. The switch 5 is called an end switch. The switch 6 is called a bottom switch. Each of these switches 4, 5 and 6 are considered to be in an on-state if it is in touch with the cartridge and, if not, to be in an off-state.

The opening part 1a is provided with a sliding lid 7 which is arranged to cover the opening part 1a by sliding. A sliding lid opening-and-closing motor 8 is arranged to drive the sliding lid 7 to open and close it. An opening slide switch 9 is arranged to detect that the sliding lid 7 is opened. A closing slide switch 10 is arranged to detect that the sliding lid 7 is closed. The switches 9 and 10 are disposed at the bottom part of the camera 1. A fork gear 11 is arranged within the cartridge chamber 1d to be operated by a feed motor 12 to pay out and rewind the leader part of the film. Further, a normal film transporting (feeding) action is performed jointly by the feed motor 12 and a spool 13. A photo reflector 14 is arranged to detect the presence or absence of the film within the camera 1.

Figure 3A:
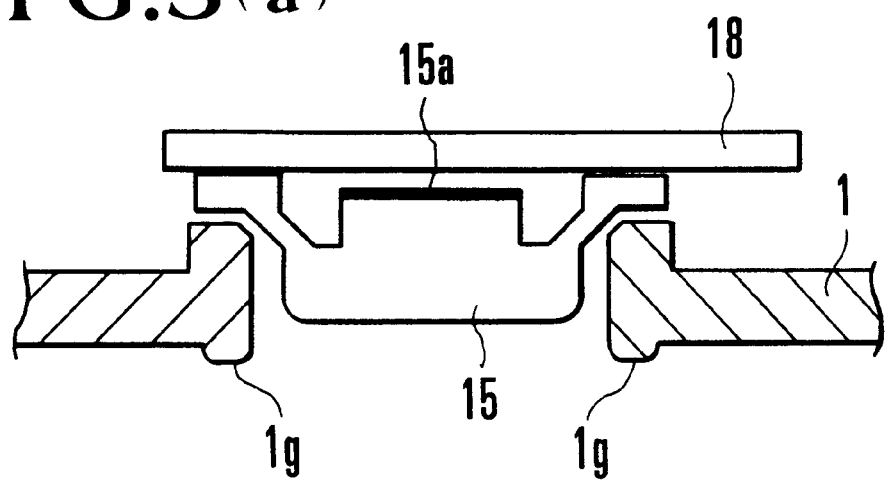
FIGS. 3(a) and 3(b) show in detail a sliding lid opening-abd-closing switch of a camera of FIG. 1.
Figure 3B:
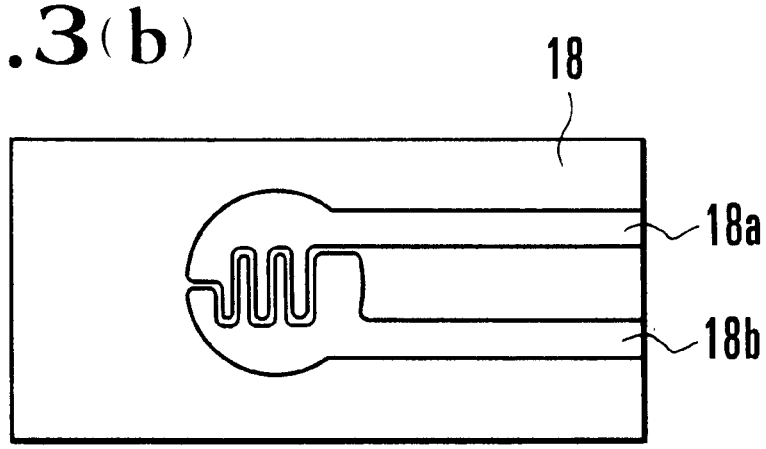

A sliding lid opening-and-closing switch 15 is arranged as shown in FIGS. 3(a) and 3(b) to control the opening and closing of the sliding lid 7. This is a contact pushing type switch. Patterns 18a and 18b which are formed on a circuit board 18 are arranged to be in electrical contact with a conductive part 15a of the switch (or button) 15 only when the switch 15 is operated. The sliding lid opening-and-closing switch 15 is disposed near the opening part 1a of the bottom part of the camera 1 and on the closing side of the sliding lid 7. The location of the sliding lid opening-and-closing switch 15 is limited to a part 1f or 1e outside of the moving range of the sliding lid 7. However, since the part 1e is too far from the opening part 1a, the switch 15 is disposed at the part 1f which is on the closing side of the sliding lid 7 and is closer to the opening part 1a. Further to prevent the button of the sliding lid opening-and-closing switch 15 from being inadvertently pushed, the height of the bottom of the sliding lid opening-closing switch 15 is arranged to be lower than the height of the bottom face of the camera 1 by forming a raised part 1g in the camera 1 around the sliding lid opening-and-closing switch 15. Meanwhile, on the other side of the bottom face of the camera 1 opposite to the part 1g, there is formed another raised part 1h to have the same height as the part 1g.

A detector 30 is arranged to detect a number of photographable frames indicated on the film cartridge when the cartridge is loaded. A warning circuit 31 is arranged to generate a warning sound. A main switch 16 is provided for turning on and off the whole camera 1.

Detection by these switches and control over the motors are performed by a microcomputer 17. FIG. 1 shows the camera as in a state in which about one half of the cartridge has been inserted into the cartridge chamber 1d and the start switch 4 is alone in an on-state.

Figure 4A:
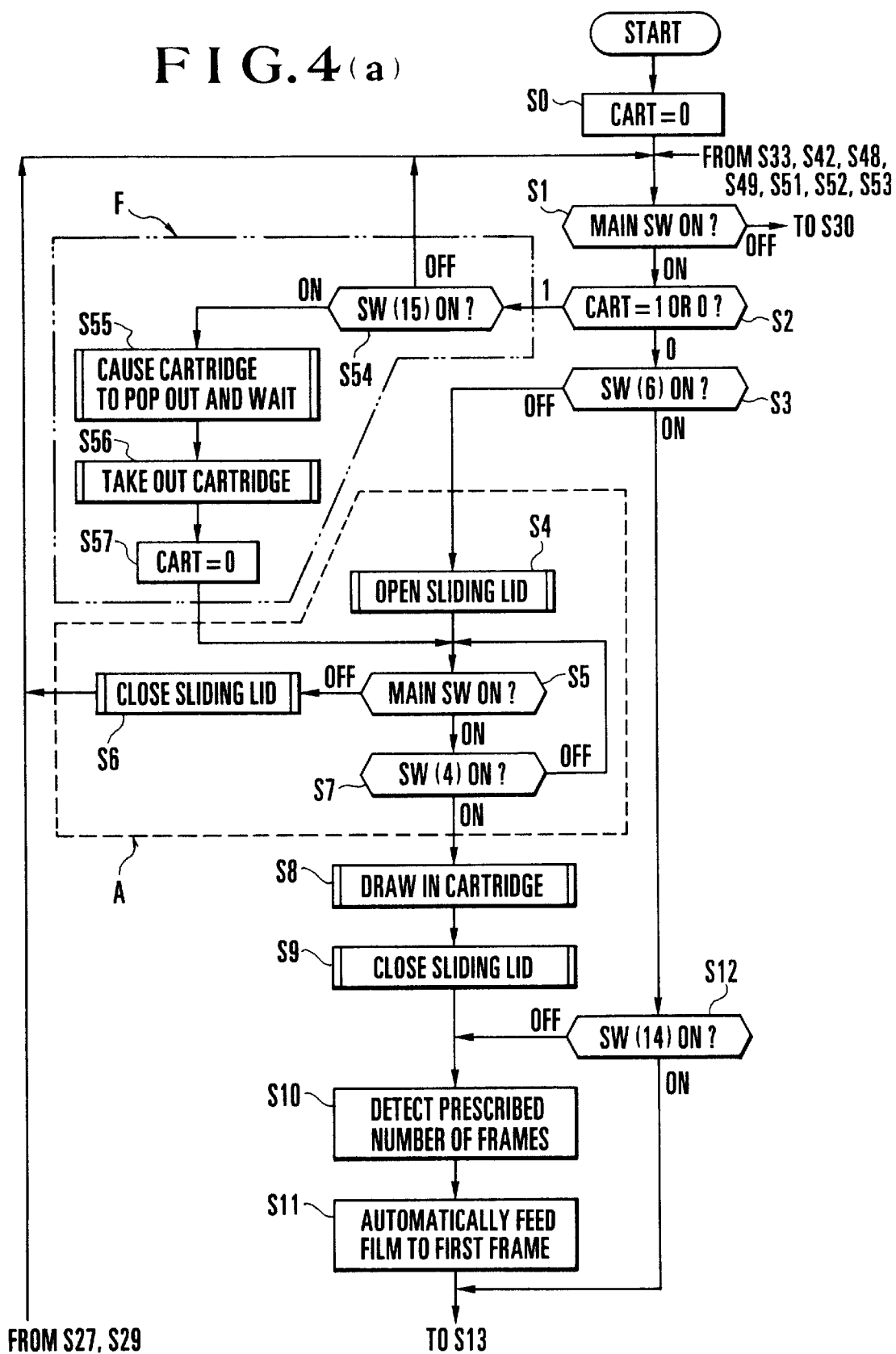
FIGS. 4(a) to 4(c) are flow charts showing main flows of operation of a microcomputer arranged to control the component elements of the camera of FIG. 1.
Figure 4B:
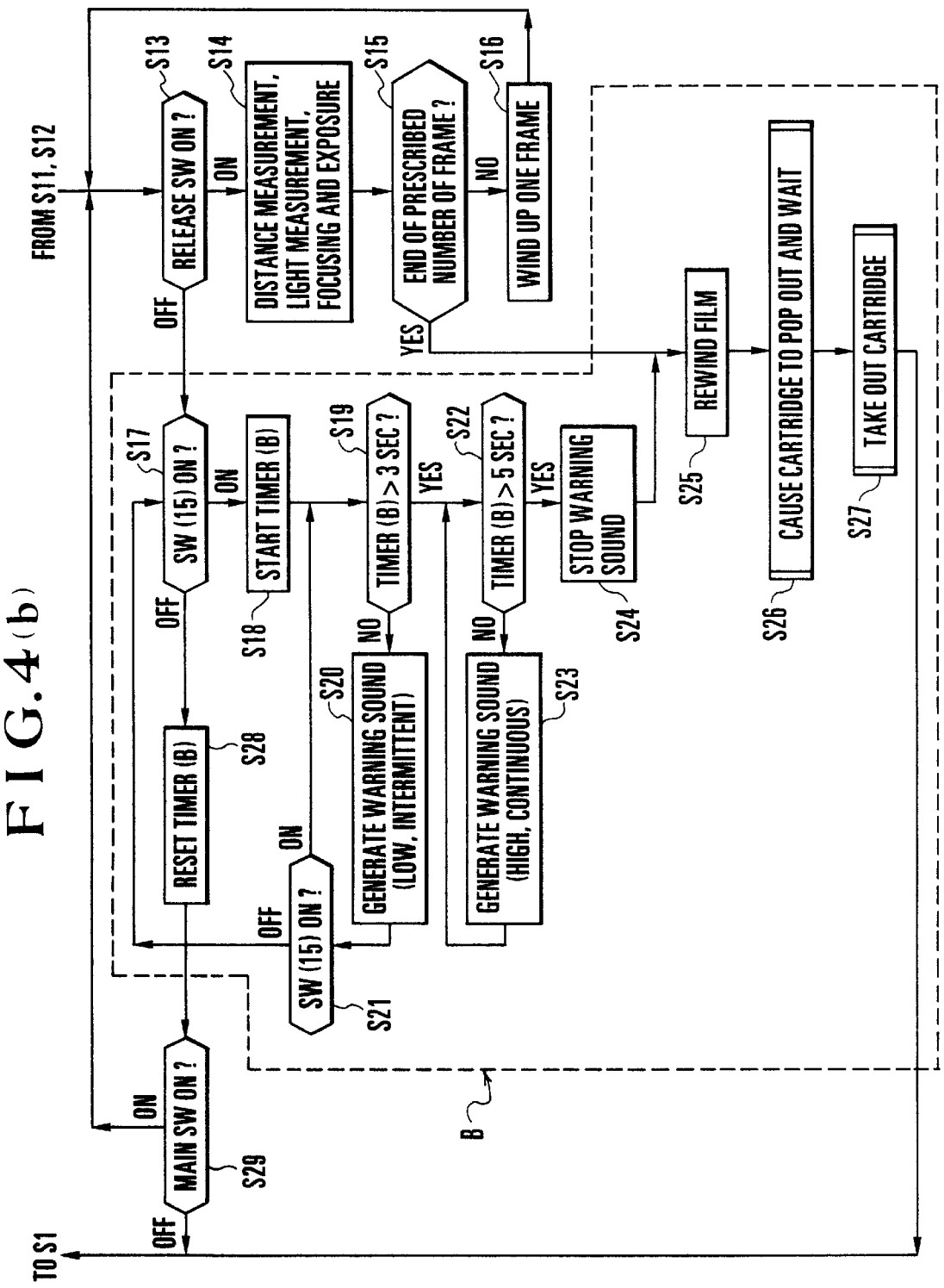
Figure 4C:
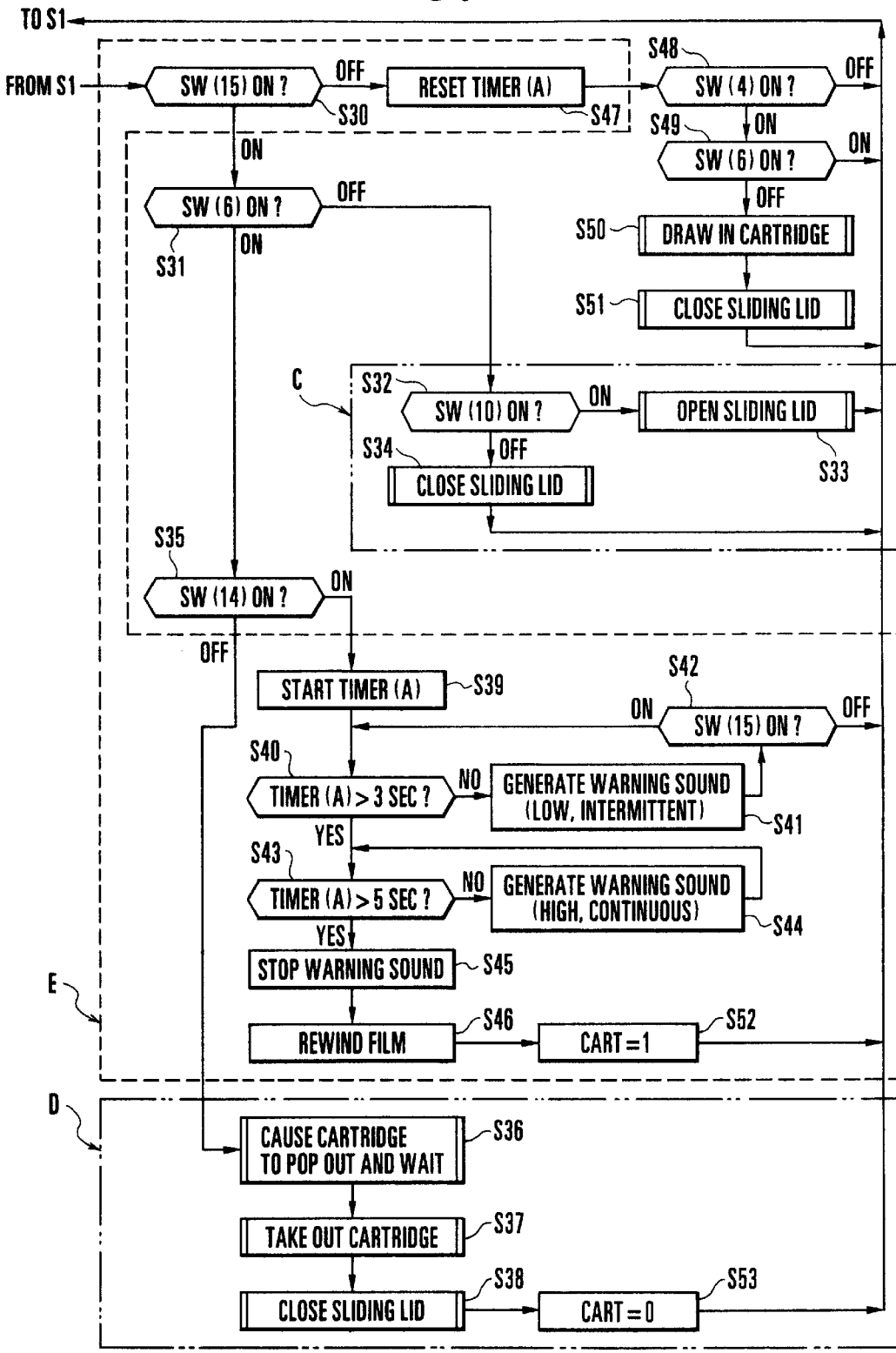

With the camera 1 arranged as described above, its overall operation is described below through the flows of operation of the microcomputer 17 shown in FIGS. 4(a), 4(b) and 4(c) which are flow charts. In FIGS. 4(a), 4(b) and 4(c), parts encompassed with broken lines and two-dot-chain lines are actions which are respectively described in the lump in the following description.

At a step S0, a flag CART disposed within the microcomputer 17 is first set at "0" to indicate that the camera is loaded with a photographable film or not loaded with any cartridge. If the flag CART is set at "1", as at a step S52, it indicates a photographed film cartridge remains in a rewound state without being taken out. At a step S1, a check is made for the state of the main switch 16. If the main switch 16 is found to be in an on-state, the flow of operation comes to a step S2. If not, the flow comes to a step S30.

At the step S2, check is made to find if the camera 1 is loaded with a photographed film cartridge. If the flag CART is at "1" thus indicating that the camera 1 is loaded with a photographed film cartridge, the flow cannot proceed to a next step S3 until the cartridge is taken out. The flow, therefore, comes to a step S54. If the flag CART is at "0", the flow comes to the step S3. At the step S3, a check is made through the bottom switch 6 to find if there is any film cartridge in the cartridge chamber 1d. If so, the bottom switch 6 is in an on-state and the flow then comes to a step S12. If not, the flow comes to a step S4 for opening and closing the slide lid 7 (shown by the broken line A). At the step S4, since there is no cartridge while the main switch 16 is in an on-state, the sliding lid 7 is opened by executing a subroutine which will be described later herein.

Next, at a step S5, the main switch 16 is checked. If the main switch 16 is found to be in an off state, the flow comes to a step S6 to close the sliding lid 7 by executing a subroutine in a manner as will be described later herein and, after that, comes back to the step S1. If the main switch 16 is found to have not been turned off, the flow comes to a step S7 to make a check for the state of the start switch 4. The steps S6 and S7 are repeated until the start switch 4 turns on to indicate that a cartridge is put into the cartridge chamber. The flow comes to a step S8 when the start switch 4 turns on.

At the step S8, the flow enters to execute a subroutine for drawing the cartridge into the cartridge chamber in a manner as will be described later. At a step S9, the sliding lid 7 is closed by the subroutine which will be described later. At a step S10, the detector 30 detects a number of photographable frames from information recorded on the cartridge and information on this number is stored in a memory disposed within the microcomputer 17. At a step S11, an automatic film loading action is carried out by causing the feeding motor 12 to drive the fork gear 11 and the spool 13. A leader part of the film is thus payed out and wound round the spool 13 in such a way as to feed the camera with a part of the film up to the first frame.

If the cartridge chamber 1d is found to have been loaded with a cartridge at the step S3, on the other hand, the flow comes to the step S12 as mentioned above. At the step S12, a check is made for the state of a photo reflector 14. If the photo reflector 14 is found to be in an on-state, it is assumed that at least one frame amount of the film has been taken up and wound round the spool 13. The flow then comes to a step 13 for shooting (or photographing). If the photo reflector 14 is found to be in an off-state, the flow comes to the steps S10 and s11 to carry out the automatic loading action before the flow comes to the step S13 for photographing.

At the step S13, a check is made to find if a release signal is received from a release switch which is not shown. If not, the flow comes to a step S17. If so, the flow comes to a step S14 to perform photographing actions including distance measurement, light measurement, focusing, an exposure, etc. At a step S15, a check is made to find if the photographing actions have been done for all the prescribed number of photographable frames. If not, the flow comes to a step S16. At the step S16, the feeding motor 12 is caused to drive the spool 13 to rotate to feed one frame amount of the film and the flow comes back to the step S13 to wait for a release signal. If the photographing actions are found at the step S15 to have been completed for all the photographable number of frames, the flow comes to a step S25 to execute a film rewinding action, which will be described later.

Meanwhile, if no release signal is found by the step S13, the flow comes to a step S17 as mentioned above. At the step S17, the flow comes to execute steps shown within a block B encompassed with a broken line in FIG. 4(b). At the step S17 within the block B, a check is made for the state of the sliding lid opening-and-closing switch 15. If the switch is found to have been turned on by pushing, the flow comes to a step S18. If not, the flow comes to a step S28. At the step S18, a timer B disposed within the microcomputer 17 is started. At a next step S19, the timer B is checked to find if the time count value of the timer B has exceeded three seconds. If not, the flow comes to a step S20. At the step S20, the warning circuit 31 is caused to generate an intermittent low warning sound to give warning against accepting a forced film rewinding operation until the lapse of a period of three seconds. At a step S21, a check is made to find if the sliding lid opening-and-closing switch 15 continues to be pushed. If so, the flow comes back to the step S19. If not, the flow comes back to the step S17 with forced film rewinding considered to have come to a stop. If the count value of the timer B is found to have exceeded three seconds at the step S19, the flow comes to a step S22. At the step S22, a check is made to find if the value of the timer B has exceeded five seconds. If not, the flow comes to a step S23. At the step S23, the warning circuit 31 is caused to generate a continuous high warning sound indicating commencement of forced rewinding for a period of two seconds before the lapse of five seconds. After the lapse of five seconds, the flow comes to a step S24 to bring the generation of the warning sound to a stop. At a step S26, the feeding motor 12 is caused to rotate the fork gear 11 to rewind the film into the cartridge. The end of film rewinding is detected by means of the photo reflector 14.

After completion of film rewinding, the flow comes to a step S26. At the step S26, the film cartridge is caused to pop out from the camera 1 to some extent by executing a subroutine which will be described later. The cartridge is held at the popped out position in a state of being sandwiched in between the rubber rollers 2a and 2b. When the sliding lid opening-and-closing switch 15 is pushed under this condition, the cartridge is moved further to a position where it is no longer sandwiched in between the rubber rollers 2a and 2b by the subroutine which will be described later herein. At a step S27, the cartridge is taken out. The flow returns to the step S1.

Meanwhile if the sliding lid opening-and-closing switch 15 is found at the step S17 to have been not pushed, the flow comes to a step S28. At the step S28, the time count value of the timer B is reset. This allows the timer B to begin its time count from an initial value even if the sliding lid opening-and-closing switch 15 is pushed again. At a step S29, a check is made for the state of the main switch. If the main switch is found to be in its on-state, the photographing operation is considered to be carried on and the flow comes to the step S13. If the main switch is found in its off-state, the flow comes back to the step S1.

In case where the main switch is found to be in its off-state at the step S1, the flow comes to a step S30 to enter sliding lid opening and closing processes as indicated by a block C of steps encompassed with a two-dot-chain line. At the step S30, a check is made to find if the sliding lid opening-and-closing switch 15 has been pushed. If not, the flow comes to a step S47. If so, the flow comes to a step S31. At the step S31, a check is made to find if the bottom switch 6 is in its on-state thus indicating that a cartridge is loaded in the cartridge chamber 1d. If so, the flow comes to a step S35. If not, the flow comes to a step S32 as the sliding lid 7 can be opened or closed as desired. At the step S32, a check is made to find whether the sliding lid 7 is open or closed through the slide switch 10 on the closing side. If the switch 10 is in its on-state thus indicating that the sliding lid 7 is closed, the flow comes to a step S33. At the step S33, the sliding lid 7 is opened through a subroutine which will be described later and the flow comes back to the step S1. If the sliding lid 7 is found to be open at the step S32, the flow comes to a step S34. At the step S34, the sliding lid 7 is closed through a subroutine which will be described later and the flow comes back to the step S1.

The flow comes to the step S35 with the cartridge chamber found to be loaded with the cartridge. At the step S35, a check is made for the state of the photo reflector 14. If the photo reflector 14 is found to be in an on-state, it is considered that at least one frame amount of film is wound up and the flow comes to a step S39 to enter a block E of steps which are encompassed with a broken line and are for a forced film rewinding process. If the photo reflector 14 is found at the step S35 to be in an off-state, indicating that the cartridge can be taken out, the flow comes to a step S36 to enter a block D of steps which are for a forced cartridge taking-out process and encompassed with a two-dot-chain line. At the step S36, the cartridge is caused by a subroutine which will be described later to pop out to a certain extent from the camera 1 and is held there in a state of being sandwiched in between the rubber rollers 2a and 2b. After that, the flow comes to a step S37. At the step S37, when the operator pushes the sliding lid opening-and-closing switch 15, the cartridge is caused by a subroutine which will be described later to be pushed further outward to a position where the rubber rollers 2a and 2b no longer sandwich it between them. At a step S38, since the main switch 16 has been judged by the step S17 to be in its off-state, the sliding lid 7 is closed by a subroutine which will be described later.

The flow then comes to a step S53 to store in the flag CART a value "0" indicating that the camera 1 has not been loaded with any cartridge.

Meanwhile, when the flow comes from the step S35 to the step S39 on the assumption that at least one frame amount of film has been wound up, the forced rewinding process as indicated by a block E encompassed with a broken line is executed. At the step S39, a timer A disposed within the microcomputer 17 is started. Steps S40 to S46 are executed in a manner which is similar to the forced film rewinding steps S17 to S25 described in the foregoing and are, therefore, omitted from description.

Upon completion of the process of rewinding at the step S46, the flow comes to a step S52. At the step S52, a value "1" which indicates that the camera is loaded with a cartridge containing a photographed film is stored in the flag CART without executing the cartridge taking-out process. The flow then comes back to the step S1.

The operation within the blocks C, D and E are arranged to be branch flows to which the flow of operation branches according to the presence or absence of the cartridge and the state of the film. Further, the forced film rewinding flow B (indicated by a broken line B) to be executed with the main switch 16 in its on-state and the other forced film rewinding flow E (indicated by a broken line E) differ from each other. The former is immediately followed by the cartridge pushing out action. In the case of the latter, the cartridge is allowed to be kept within the camera 1 after film rewinding. These flows B and E, however, may be replaced with each other as in the case of a flow chart shown in FIG. 11. Further, either of them can be arranged to be followed by the cartridge pushing out action or by the keeping state.

With the sliding lid opening-and-closing switch 15 found to be not pushed at the step S30, the flow comes to a step S47 to reset the timer A disposed within the microcomputer 17. At a step S48, a check is made to find if the start switch 4 has been turned on to indicate that the cartridge is placed in the cartridge chamber. If so, the flow comes to a step S49. If not, the flow comes back to the step S1. At the step S49, the bottom switch 6 is checked to find if the switch is in its on-state to show that the cartridge has been completely loaded. If so, the flow comes back to the step S1. If not, the flow comes to a step S50. At the step S50, a subroutine for drawing in the cartridge is executed in a manner as will be described later. After that, the flow comes to a step S51 to execute a subroutine for closing the sliding lid 7 in a manner as will be described later. The flow then comes back to the step S1.

The flow comes from the step S2 to the step S54 with a cartridge which has been used for photographing found to be loaded as mentioned above. At the step S54, a check is made to find if the sliding lid opening-and-closing switch 15 has been pushed. If not, the flow comes back to the step S1. These steps are repeated until the switch 15 is pushed. When the switch is found to have been pushed at the step S54, the flow comes to a step S55. At the step S55, a process for taking out the cartridge is executed by a subroutine which will be described later. The process includes an action of causing the cartridge to pop out to a certain extent from the camera 1 to come to a position where it remains in a state of being sandwiched in between the rubber rollers 2a and 2b. After that, the flow comes to a step S56. At the step S56, when the operator pushes the sliding lid opening-and-closing switch 15, another action is performed to move the cartridge further outward to a position where the cartridge is no longer sandwiched in between the rubber roller 2a and 2b. At a step S57, the flag CART is set at a value "0" which indicates that the camera is not loaded with any cartridge. The flow then comes to a step S5.

Next, the subroutines mentioned in the above description with reference to FIGS. 4(a), 4(b) and 4(c) are described below with reference to FIGS. 5 to 9.

FIG. 5 shows the subroutine to be executed at the step S4 of FIG. 4(a) and the S33 of FIG. 4(c) for opening the sliding lid 7. At a step S60, the motor 8 for opening and closing the sliding lid is energized in the direction of opening the sliding lid 7. At a step S61, a check is made to find if the sliding lid 7 is opened to turn on the opening side slide switch 9. The sliding lid opening-and-closing motor 8 continues to be energized until the slide switch 9 is turned on. At a step S62, the motor 8 is deenergized to bring it to a stop.

FIG. 6 shows the subroutine to be executed at the steps S6, S9, S34, S38 and S51 of FIGS. 4(a) and 4(c) for closing the sliding lid 7. At a step S63, the sliding lid opening-and-closing motor 8 is energized in the direction of closing the sliding lid 7. At a step S64, a check is made to find if the sliding lid 7 is closed to turn on the slide switch 10 disposed on the closing side. The sliding lid opening-and-closing motor 8 continues to be energized until the slide switch 10 turns on to indicate that the sliding lid 7 is closed. The flow then comes to a step S65 to deenergize the motor 8 to bring it to a stop.

FIG. 7 shows the subroutine to be executed at the steps S8 and S50 of FIGS. 4(a) and 4(c) for drawing in the cartridge. This subroutine begins after receipt of a signal from the start switch 4, as mentioned above. At a step S70, the roller driving motor 3 is energized to cause it to rotate the rubber roller 2a in the direction of drawing the cartridge inward. At a step S71, a check is made to find if the bottom switch 6 has been turned on to indicates completion of loading the cartridge within the cartridge chamber 1d. The roller driving motor 3 continues to be energized until the bottom switch 6 turns on. Then, the flow comes to a step S72 to bring the roller driving motor 3 to a stop by deenergizing it.

Figure 8:
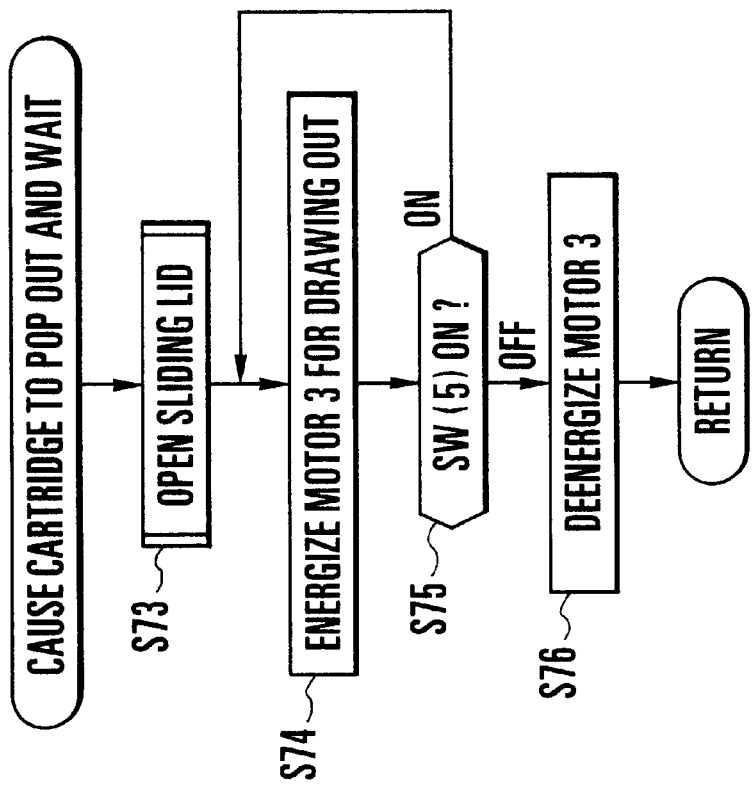
FIG. 8 is a flow chart showing the subroutine of cartridge popping out and waiting processes shown in the flow charts of FIGS. 4(b) and 4(c).

FIG. 8 shows the subroutine to be executed at the steps S26, S36 and S55 of FIGS. 4(b) and 4(c) for popping out the cartridge and waiting. At a step S73, for taking the cartridge out from the cartridge chamber 1d, the sliding lid 7 is first opened by executing the sliding lid opening subroutine of FIG. 5. At a step S74, the roller driving motor 3 is energized in the direction of drawing the cartridge out. The rubber roller 2a is caused to rotate in the direction of drawing the cartridge outward. At a step S75, a check is made to find if the end switch 5 has turned off. The roller driving motor 3 continues to be energized until the end switch 5 turns off. The flow then comes to a step S76 to bring the roller driving motor 3 to a stop by denergizing it. Under the condition thus obtained, the cartridge still remains in a state of being sandwiched in between the rubber rollers 2a and 2b and, therefore, never drops off the camera 1 though it has popped out to a certain extent.

Figure 9:
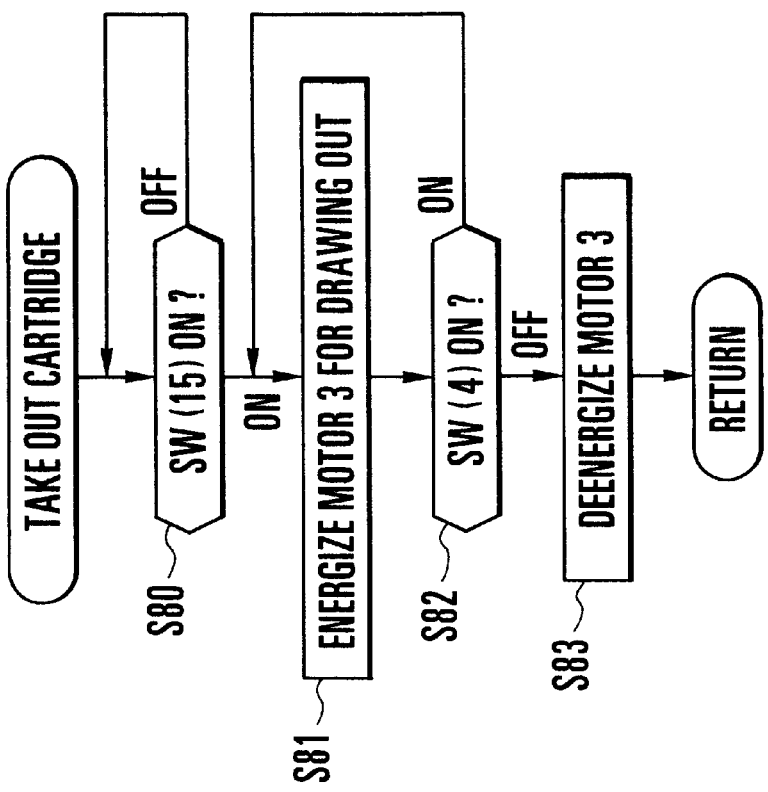
FIG. 9 is a flow chart showing the subroutine of a cartridge taking out action shown in the flow charts of FIGS. 4(b) and 4(c).

FIG. 9 shows the subroutine to be executed at the steps S27, S37 and S56 of FIGS. 4(b) and 4(c) for taking the cartridge out. At a step S80, the sliding lid opening-and-closing switch 15 is first checked to find if it has been pushed. If not, the flow of operation waits until the switch 15 is pushed. With the switch 15 found to have been pushed, the flow comes to a step S81. At the step S81, the roller driving motor 3 is energized in the direction of drawing the cartridge out. The rubber roller 2a is thus caused to rotate in the direction of drawing the cartridge outward. At a step S82, the start switch 4 is checked to find if it has been turned off. The roller driving motor 3 continues to be energized until the start switch 4 comes to turn off. At a step S83, with the start switch found to have turned off, the roller driving motor 3 is brought to a stop. These steps enables the operator to push the sliding lid opening-and-closing switch 15, of own accord, to have the cartridge eventually pushed out to a position where it is no longer sandwiched in between the rubber rollers 2a and 2b. The start switch turns off. The cartridge then can be taken out from the cartridge chamber 1d.

Figure 10:
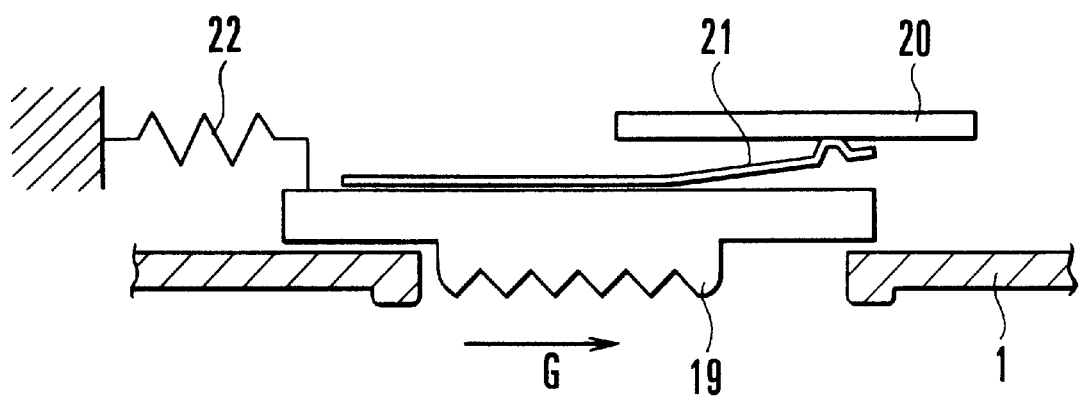
FIG. 10 is a sectional view showing a sliding lid opening-and-closing switch arranged in the camera of FIG. 1 as another embodiment of this invention.

FIG. 10 shows another sliding lid switch which is arranged as a second embodiment of this invention. In the case of the second embodiment, the sliding lid opening-and-closing switch is not of the pushing type but is of a sliding type. Referring to FIG. 10, the switch turns on (becomes conductive) only when the switch 19 is slid against the force of a tension spring 22 in the direction of arrow G to cause a contact piece secured to the switch 19 to slide over a circuit board 20. This arrangement effectively prevents the switch from being inadvertently turned on.

Figure 11A:
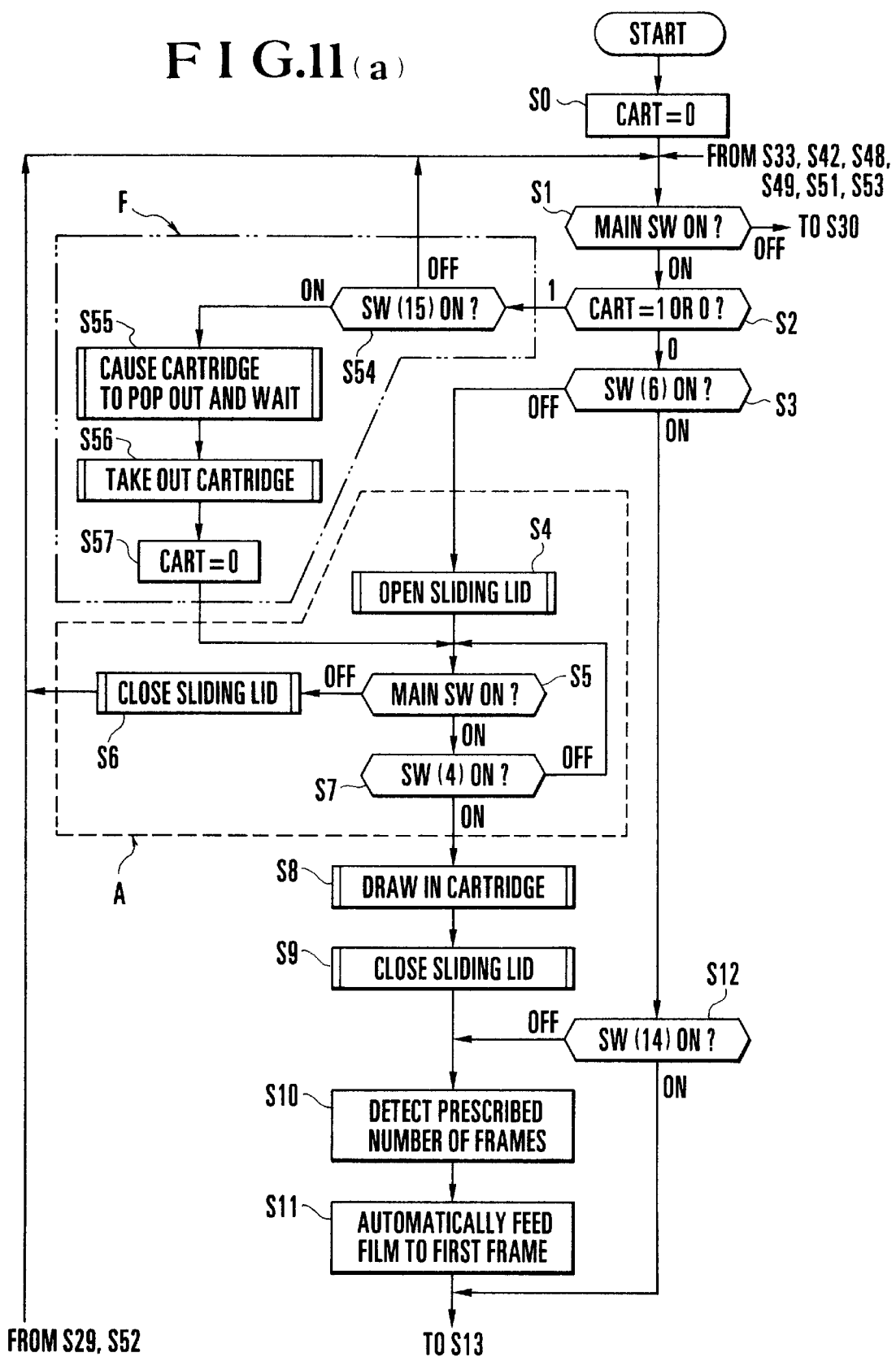
FIGS. 11(a), 11(b) and 11(c) are flow charts showing parts of the flow charts of FIGS. 4(b) and 4(c) arranged as a further embodiment of this invention.
Figure 11B:
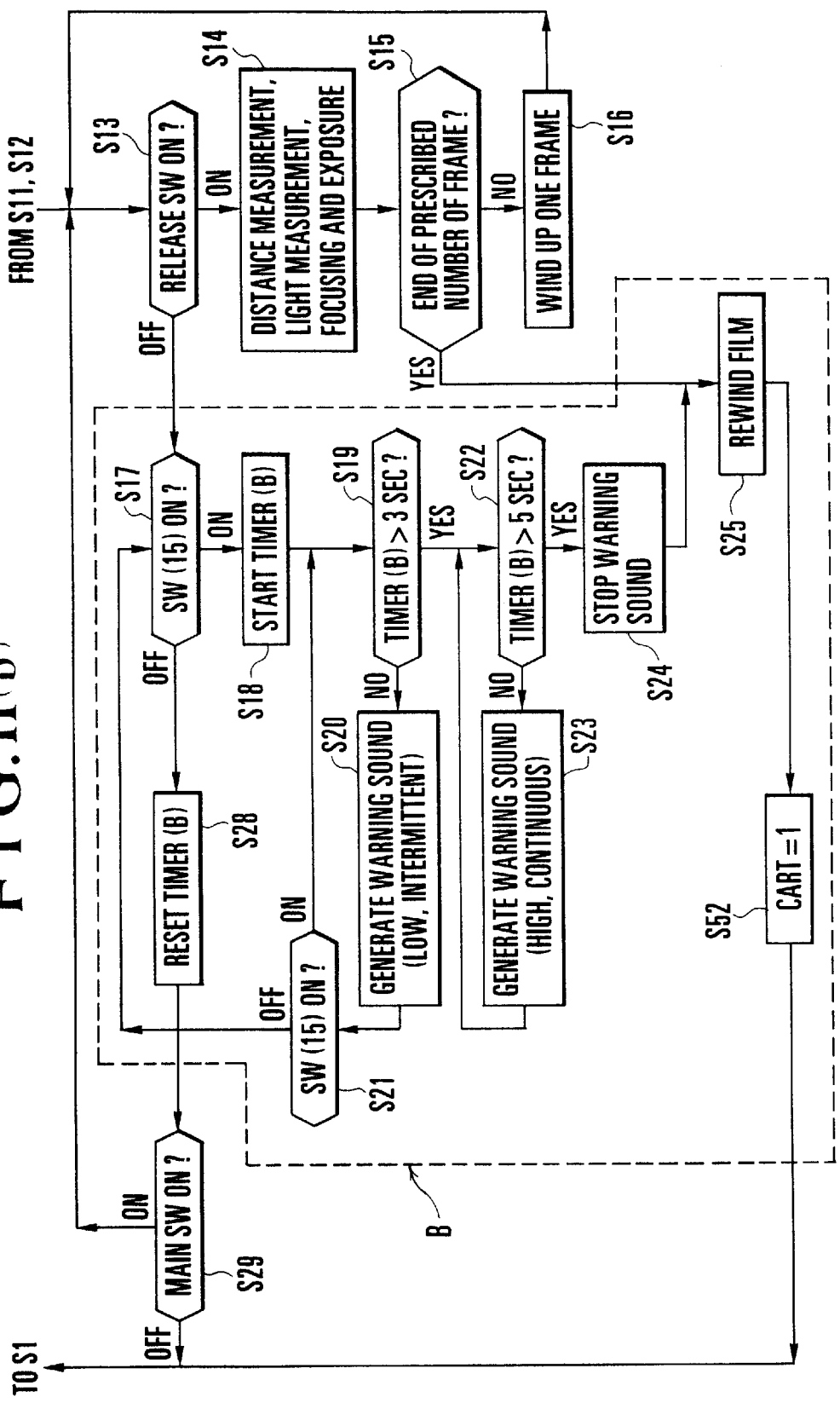
Figure 11C:
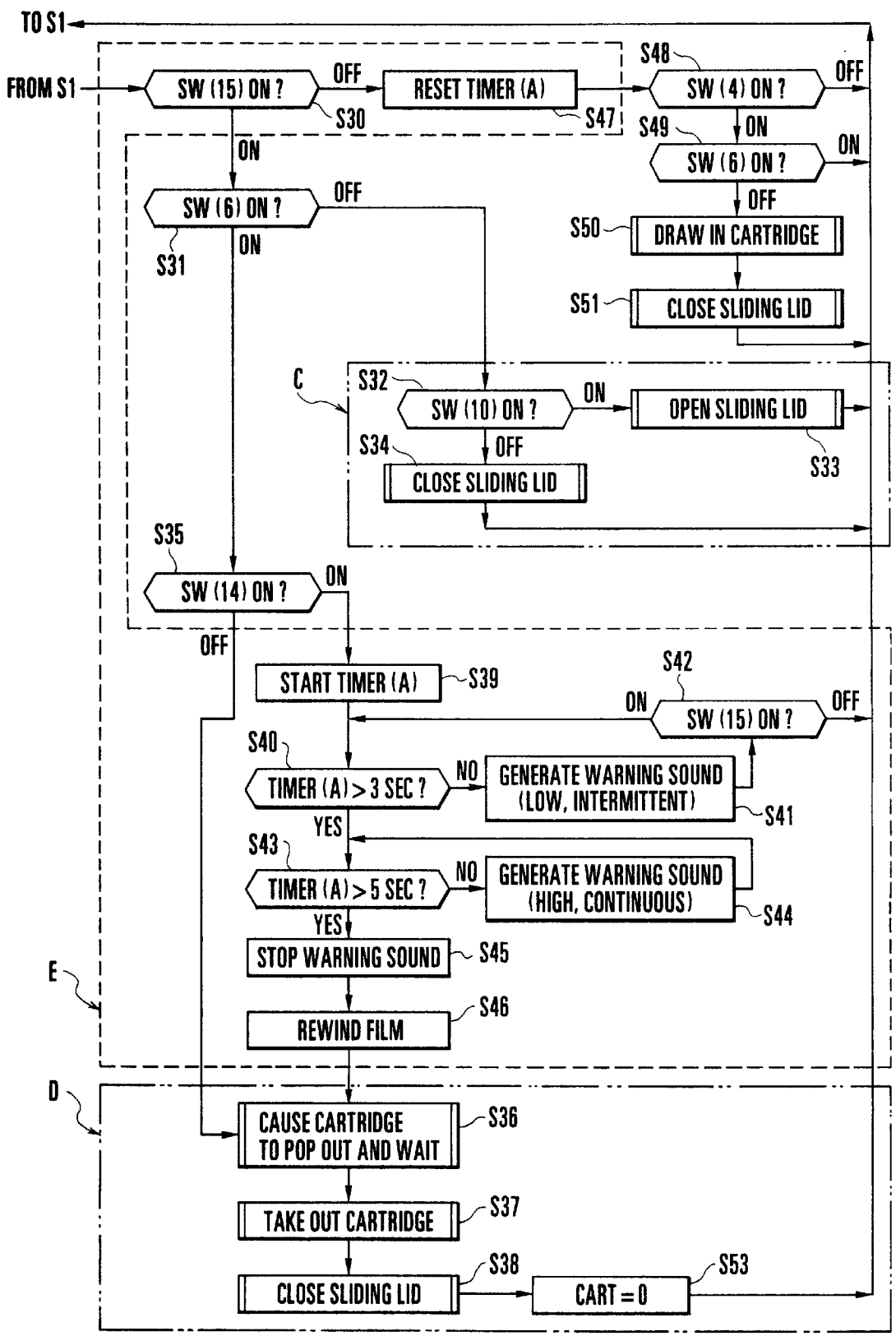
Figure 12:
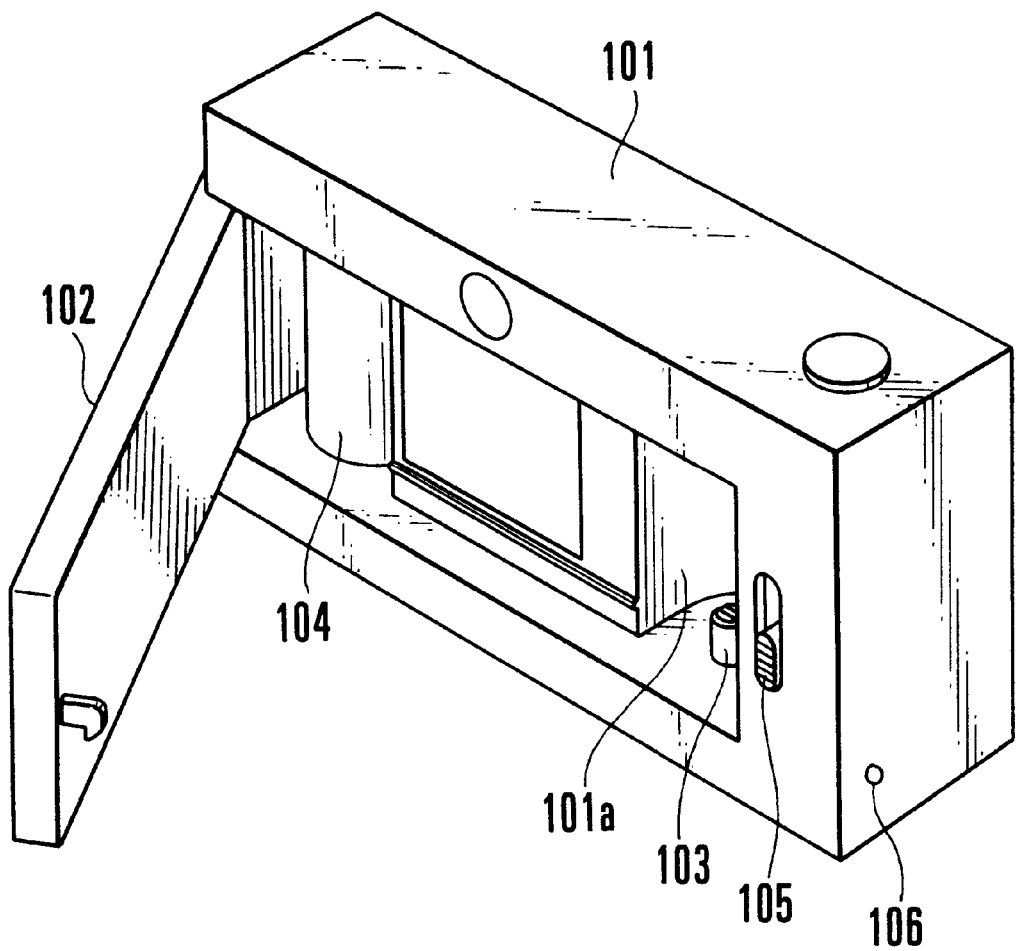
FIG. 12 is an oblique view showing in outline the arrangement of the conventional camera.

FIGS. 11(a), 11(b) and 11(c) show in flow charts a third embodiment of this invention. In the case of the third embodiment, after film rewinding, the cartridge is handled inversely to the flow charts of FIGS. 4(a), 4(b) and 4(c). The flow charts of FIGS. 11(a), 11(b) and 11(c) include changes made from the first embodiments shown in FIGS. 4(a), 4(b) and 4(c). The third embodiment differs from the first embodiment in the following points. After the forced rewinding is carried out with the main switch 16 in an off-state, the flow, in this case, comes from the step S46 to the step S36. The flow thus continuously shifts to the cartridge pushing out action. In case where the film rewinding is carried out with the main switch 16 in an on-state, the flow comes, after the film rewinding, from the step S25 to the step S52 to enter the loop of the step S1. Therefore, according to this flow of operation, the cartridge is left within the camera 1 as it is.

The arrangement of each embodiment described enables the camera to carry out the automatic loading and taking-out (unloading) actions on a film cartridge with excellent operability and gives the following advantages:

(i) The sliding lid opening-and-closing switch 15 which is to be operated in loading and taking out a film cartridge is disposed in a position which is located in the direction of closing the sliding lid 7 to allow the sliding lid 7 to be opened and closed without hindrance. Hence, the switch 15 can be arranged near to the opening part 1a in such a position that can be easily found and permits an easy operation. Further, since the height of the switch 15 is arranged to be lower than the bottom part of the camera 1, the switch 15 is effectively prevented from being inadvertently operated.

(ii) Since the sliding lid 7 can be opened and closed and the cartridge can be taken out by operating one and the same button, the number of necessary parts can be reduced and the operability can be enhanced.

(iii) In case where the camera is loaded with no cartridge, the absence of a cartridge can be confirmed by turning on the main switch to open the sliding lid, with the sliding lid 7 arranged to be opened and closed in association with turning on or off of the main switch 16. The camera thus can be easily loaded with a cartridge.

(iv) The sequence of actions which opens the sliding lid opening-and-closing switch 15 through the processes of "forced rewinding"—"taking the cartridge out"—"opening the sliding lid 7" is used for opening the sliding lid opening-and-closing switch 15 to eventually bring about a forced film rewinding mode. The problem presented by the position of the conventional forced film rewinding button which is not readily discernible can be solved by the arrangement according to this invention. Further, since the sliding lid 7 is not opened before completion of the film rewinding, a roll of film which has been exposed will never be inadvertently exposed to light.

(v) The provision of a flow of operation which is programmed to move the cartridge out by opening the sliding lid continuously from completion of the film rewinding action and another flow of operation which is programmed to allow the cartridge remain as it is within the camera 1 enables the operator either to easily take out the cartridge from the camera 1 or to carry the camera 1 with the cartridge left inside of the camera 1.

(vi) In taking out the cartridge from the camera 1, the arrangement of suspending the process of automatically moving the cartridge out halfway till the sliding lid opening-and-closing switch 15 is pushed before the cartridge is actually taken out ensures that the cartridge can be safely taken out without being inadvertently dropped off the camera 1.

In the embodiments described, the method for loading and unloading the cartridge is not limited to the use of the rubber rollers. In practicing this invention, the rubber rollers of course may be replaced with some other suitable means such as hooking or engaging members.

Further, in accordance with this invention, the warning sound of the embodiments described of course may be replaced with some other optical display or the like.

This invention applies also to use of an image recording medium other than a film.

This invention applies not only to an apparatus using the cartridge of the kind described in the present specification but also to an apparatus using a cartridge of a type which differs from the type described, a cartridge of some other kind, a cartridge containing an image recording medium other than a film or a container other than a cartridge.

Further, in accordance with this invention, the embodiments described or the technological elements of them may be combined into various suitable forms.

This invention applies also to an apparatus which consists of the components of the embodiments described either in their entirety or in part. The embodiments may be combined with some other apparatus or may be employed as a component of an apparatus.

This invention is applicable not only to cameras of varied kinds, such as a single-lens reflex camera, a lens-shutter type camera and a video camera but also to an optical apparatus or some other apparatus other than a camera and to a device or an element that is employed as a component of a camera, an optical apparatus or the like.

The individual components shown in schematic or block form in the drawings are all well-known in the camera arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted to a film cartridge, comprising:
   a) an opening device which opens a cover of a film cartridge loading chamber;
   b) a first operation device which outputs an instruction signal for causing said opening device to open the cover by an operation performed from outside the apparatus; and
   c) a second operation device which outputs an instruction signal for causing said opening device to open the cover by an operation performed from outside the apparatus.

2. An apparatus according to claim 1, wherein said opening device includes a motor.

3. An apparatus according to claim 1, further comprising the cover of said film cartridge loading chamber.

4. An apparatus according to claim 1, wherein said first operation device includes a switch for operating said cover.

5. An apparatus according to claim 4, wherein said second operation device includes a switch for starting the apparatus.

6. An apparatus according to claim 1, wherein said second operation device includes a switch for starting the apparatus.

7. An apparatus adapted to an image recording medium cartridge, comprising:
   a) an indication device which gives an instruction to unload the cartridge from the apparatus;
   b) an unloading device which automatically opens a cover of the apparatus and unloads the cartridge from the apparatus in response to the instruction of said indication device, said unloading device being arranged not to unload the cartridge from the apparatus when an image recording medium is outside of the cartridge; and
   c) an informing device which informs an operator of a state of the image recording medium being outside of the cartridge.

8. An apparatus according to claim 7, wherein said indication device includes means for giving the instruction by an operation performed from outside the apparatus.

9. An apparatus according to claim 7, wherein said unloading device includes a motor.

10. An apparatus according to claim 7, wherein said informing device includes means for giving a warning.

11. An apparatus according to claim 7, wherein said image recording medium includes a film.

12. An apparatus adapted to an image recording medium cartridge, comprising:
   a) an indication device which gives an instruction to unload the cartridge from the apparatus; and
   b) an unloading device which moves an image recording medium back into the cartridge in response to the instruction of said indication device, and then, unloads the cartridge from the apparatus.

13. An apparatus according to claim 12, wherein said indication device includes means for giving the instruction by an operation performed from outside the apparatus.

14. An apparatus according to claim 12, wherein said unloading device includes a motor.

15. An apparatus according to claim 12, wherein said unloading device includes means for determining whether the image recording medium is outside of the image recording medium cartridge.

16. An apparatus according to claim 12, wherein said image recording medium includes a film.

17. An apparatus according to claim 12, further comprising means for preventing said unloading device from responding to an erroneous operation on said indication device.

18. An apparatus adapted to an image recording medium cartridge, comprising:
   a) an indication device which gives an instruction to unload said cartridge from the apparatus; and
   b) an unloading device which automatically unloads said cartridge from the apparatus in response to the instruction of said indication device, said unloading device arranged to temporarily bring the cartridge to a stop when the cartridge is removed halfway from the apparatus and, said unloading device arranged to unloading again, in response to an operation from outside the apparatus, the image recording medium cartridge further from the apparatus after said temporarily stopping of the cartridge.

19. An apparatus according to claim 18, wherein said unloading device includes a motor.

20. An apparatus according to any one of claims 1, 7, 12 and 18, wherein said apparatus includes a camera.

21. An apparatus according to any one of claims 1, 7, 12 and 18, wherein said apparatus includes a device which is adapted to a camera.

22. An apparatus adapted to a film cartridge, comprising:
   a) a closing device which closes a cover of a film cartridge loading chamber;
   b) a first operation device which outputs an instruction signal for causing said closing device to close the cover by an operation performed from outside the apparatus; and
   c) a second operation device which outputs an instruction signal for causing said closing device to close the cover by an operation performed from outside the apparatus.

23. An apparatus according to claim 22, wherein said closing device includes a motor.

24. An apparatus according to claim 22, wherein said first operation device includes a switch for operating said cover.

25. An apparatus according to claim 24, wherein said second operation device includes a switch for starting the apparatus.

26. An apparatus according to claim 22, wherein said second operation device includes a switch for starting the apparatus.

27. An apparatus according to claim 22, wherein said apparatus includes a camera.

28. An apparatus according to claim 22, wherein said apparatus includes a device which is adapted to a camera.

* * * * *

UNITED STATES PATENT AND TRADEMARK OFFICE
CERTIFICATE OF CORRECTION

PATENT NO.    : 6,141,506
DATED         : October 31, 2000
INVENTOR(S)   : Kazushige Ichino It is certified that error appears in the above-identified patent and that said Letters Patent is hereby corrected as shown below:

Column 2,
Line 51, delete "abd" and insert -- and --.

Column 5,
Line 16, delete "s11" and insert -- S11 --.

Signed and Sealed this

Eighteenth Day of December, 2001

*Attest:*

*Attesting Officer*

JAMES E. ROGAN
*Director of the United States Patent and Trademark Office*